United States Patent [19]

Buhse et al.

[11] Patent Number: 4,611,226
[45] Date of Patent: Sep. 9, 1986

[54] TELEVISION RECEIVER INCORPORATING A PROCESSING SECTION FOR PROCESSING STEREO/MULTICHANNEL-SOUND SIGNALS

[75] Inventors: Ulf H. Buhse, Kollmar; Hans-Jürgen Kühn, Buchholz, both of Fed. Rep. of Germany

[73] Assignee: U.S. Philips Corporation, New York, N.Y.

[21] Appl. No.: 614,187

[22] Filed: May 25, 1984

[30] Foreign Application Priority Data

May 27, 1983 [DE] Fed. Rep. of Germany ....... 3319237
May 27, 1983 [DE] Fed. Rep. of Germany ....... 3319238

[51] Int. Cl.⁴ .............................................. H04N 7/04
[52] U.S. Cl. ..................... 358/144; 358/198; 381/1; 381/2; 381/3; 381/17
[58] Field of Search ............... 358/143, 144, 145, 197, 358/198; 370/74, 98; 381/1, 2, 3, 17, 4; 329/50, 111, 112

[56] References Cited

FOREIGN PATENT DOCUMENTS 0076981 4/1983 European Pat. Off. ............ 358/144

OTHER PUBLICATIONS

"Integrierbarer Ton-ZF-Teil eines Fernsehempfängers"; Funk-Technik, 1966, No. 19, pp. 680–682 by H. Mosel.
"Zwei-Kanal-Fernsehton"; Funkschau, 2/1982, pp. 76–79.
Data Sheet on the TDA 4940 FM IF Amplifier with Pilot Tone Decoding for TV Stereo Application, marketed by Siemens, pp. 513–519.

*Primary Examiner*—James J. Groody
*Assistant Examiner*—Michael D. Parker
*Attorney, Agent, or Firm*—Thomas A. Briody; William J. Streeter; Edward W. Goodman

[57] ABSTRACT

A processing section for a television receiver for processing stereo/dual sound signals having a first sound carrier modulated by a first sound signal, and a second sound carrier modulated both by a second sound signal and by a pilot signal which, in turn, is modulated by a stereo/dual sound identifying signal. The processing section does not require a reference frequency from the synchronizing or intermediate frequency portion of the television receiver for recovering the pilot signal, but, rather, uses the pilot signal to control an oscillator in a phase-locked loop which loop is used to generate a signal for down-converting the frequency range of at least the modulated second sound carrier thereby obviating the need for expensive, precision filtering components.

3 Claims, 4 Drawing Figures

TELEVISION RECEIVER INCORPORATING A PROCESSING SECTION FOR PROCESSING STEREO/MULTICHANNEL-SOUND SIGNALS

BACKGROUND OF THE INVENTION

The invention relates to a television receiver incorporating a processing section for processing stereo/dual sound signals having a first sound carrier which is modulated by a first sound signal and a second sound carrier modulated by a second sound signal and also by a pilot signal which is modulated by a stereo-dual sound identifying signal, said processing section comprising a synchronous demodulator in which the pilot signal is demodulated and to which an output signal of a Phase-Locked Loop circuit is applied, the phase-locked loop circuit comprising a frequency-controllable oscillator and a phase discriminator which compares a signal derived from the oscillator with a reference signal which, as regards frequency and phase, is in a fixed relationship to the pilot signal. Such a television receiver is obtained when the known integrated circuit TDA 4940 marketed by Siemens is used.

As is known, two frequency-modulated sound carriers are used, according to the German standard, for the transmission of stereo/dual sound television signals, the second, for instance weaker, sound carrier being frequency-modulated by a pilot carrier which, in the case of stereo or dual sound transmission, is amplitude-modulated by an identifying signal which characterizes the stereo or dual-sound transmission mode and which is required in the receiver to enable the required switching actions to be effected automatically. In a television receiver comprising the prior art circuit, the identifying signal is obtained in that the modulated pilot carrier is multiplied by the output signal of a PLL circuit whose oscillator oscillates at a frequency equal to 28-times the line frequency and whose frequency is controlled by a phase discriminator which compares the frequency-divided oscillator signal with the line frequency.

The fact that, in accordance with the relevant German standard, the line frequency is in a fixed frequency and phase-relationship to the pilot carrier frequency is utilized, and the pilot carrier frequency is precisely 3.5-times the line frequency. As a result thereof, a signal which is phase-locked onto the pilot carrier can be recovered from the ocscillator signal by means of a 1:8-frequency divider. Then only the modulation product of the pilot carrier, that is to say one of the two identifying signals, is then only present at the output of the multiplier circuit.

An advantage of this circuit is that it has a high identifying signal reliability and sensitivity. A disadvantage is that it always requires the presence of a signal of the line frequency which is phase-locked onto the pilot carrier frequency. This signal is, however, not always available. Novel receiving and display concepts provide, for example, the possibility to connect the receiving section of a television receiver to a video recorder and the display section to a video disc player. However, for recording with the video recorder, the identifying signal must already have been demodulated. The line-frequency signal required therefore is however only available in the display section of the television receiver and is derived from the video disc, and consequently has no fixed phase relationship with the pilot carrier. The prior art circuit is not suitable for such a receiver concept.

To recover the pilot signal, from the antenna signal it is necessary for the carriers contained in the antenna signal and on which the sound signals are frequency modulated, to be first converted into a frequency corresponding to the frequency spacing of the two carriers from the picture carrier on which the video signal is modulated. For the German standard, two sound carriers are obtained in this manner at 5.5 and 5.742 MHz, respectively. In a known television receiver published in Funkschau 2, 1982, pages 76 to 79, these two sound carriers are separated from each other by two filters and demodulated by two demodulators, which produce the two sound signals and also the modulated pilot signal.

As in the dual-sound mode, the two sound signals are independent from each other as regards their content, a very high cross-talk attenuation, for instance better than 60 dB is necessary between the two sound channels. For that reason and as the frequency spacing of the upper side band of the sound carriers to the lower frequency of the lower sideband of the sound carriers having the higher frequency—relative to the sound carrier frequencies—is very small, the filter arrangement must be formed from very expensive high-selection filters. For that purpose, the known arrangement utilizes ceramic filters. Also the FM-demodulators require resonant circuits which, in the known receiver, are also ceramic filters. All the filters and resonant circuits must be balanced. Consequently, the processing section for processing the dual-sound stereo signals is very expensive.

A further disadvantage is that with such a receiver, only signals in accordance with the German standard can be received. If signals in accordance with a different standard, that is to say with an other frequency of the sound carrier or a different frequency spacing between the carriers for the picture and the sound information, must be processed, additional filter, resonant circuits, etc. are required.

SUMMARY OF THE INVENTION

The present invention has for an object to implement a television receiver of the type set forth in the opening paragraph, in such a way that the cost is reduced and that, while maintaining a good identifying signal reliability and sensitivity, a reference frequency from the synchronizing or intermediate frequency portion of the television receiver for recovering the pilot signal is not required.

According to the invention, this object is accomplished in that an oscillator output signal is applied to a mixer stage which mixes at least the second sound carrier with the oscillator output signal and converts this second sound carrier to a lower frequency range and that an output singal of the mixer stage is applied via a demodulator to a filter selecting the pilot signal and whose output signal is applied to the phase discriminator as a reference signal.

"Sound carrier" must be understood to mean a carrier whose frequency corresponds to the frequency spacing between the carrier carrying the sound information and the carrier carrying the video information. As a rule the sound carrier or sound carriers are recovered as an intercarrier signal in an intercarrier method, that is to say, as a mixed product of the sound carrier(s) for the sound information and the carrier for the video information.

In accordance with the invention, also the pilot signal is used for controlling the oscillator comprised in the phase-locked loop circuit, so that a reference signal from the synchronizing or the intermediate frequency portion is not necessary. It is true that because of the conversion of the two sound carriers to a lower frequency range with the aid of the mixer stage, the frequency distance is indeed not changed, but the cost for the filter arrangement is reduced as the requirements inposed on their selectivity becomes lower, accordingly, as the ratio between the frequency spacing and the converted carrier frequency is lower. When the circuit according to the invention is used in a multistandard receiver, on receipt of transmissions in accordance with a different standard using only one sound carrier, only the oscillator of the phase-locked loop circuit is required. The frequency of this oscillator must then only be switched to a different value, while the filter arrangement may remain unchanged when the oscillator frequency is chosen, such that the converted frequency can be processed by the demodulator for demodulating the sound carrier and also by the filters which may preceed it.

With the invention, the oscillator has a new function. On the one hand, it forms part of the phase-locked loop circuit and, on the other hand, it is used to convert the two sound carriers to a lower frequency band.

It should here be noted that from "Funktechnik" 1966, No. 19, pages 680 to 682 a television receiver is known per se in which the frequency-modulated intercarrier signal, that is to say the sound carrier, is converted to a lower intermediate frequency so that the cost for demodulation is appreciably reduced. Nevertheless, the prior art television receiver does not allow the processing of stereo-dual sound signals.

DESCRIPTION OF THE DRAWINGS

The invention will now be described in greater detail, by way of example, with reference to the accompanying drawing, in which.

DESCRIPTION OF THE PREFERRED EMBODIMENTS

Figure 1:
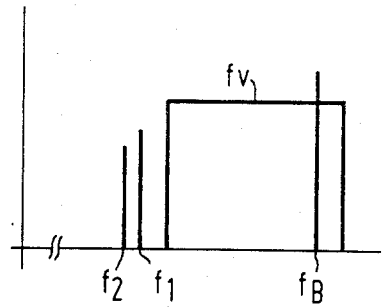
FIG. 1 shows the frequency spectrum of a television signal in the intermediate-frequency range.

In FIG. 1, $f_B$ denotes the intermediate frequency of the carrier for the picture information. It is located at approximately 38.9 MHz. The frequency spectrum of the video signal in the intermediate frequency range is denoted by $f_V$-5.5 MHz below the picture carrier there is the carrier $f_1$ for the first sound information whose amplitude is 13 dB lower than the amplitude of the picture carrier, and below that is the carrier $f_2$ for the second sound information, whose amplitude is 20 dB lower than the amplitude of the carrier for the picture imformation and whose frequency spacing from $f_B$ is 5.742 MHz.

Figure 2:
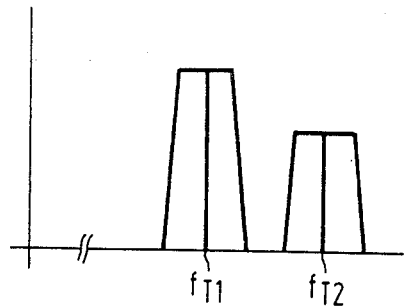
FIG. 2 shows the frequency spectrum of the sound carriers after intercarrier demodulation.

After the intercarrier formation, the two sound carriers occupy the position shown in FIG. 2. The video sideband $f_v$ is not shown for the sake of clarity. The first sound carrier $f_{T1}$ is then located at 5.5 MHz and the second sound carrier $f_{T2}$ at 5.742 MHz.

Figure 4:
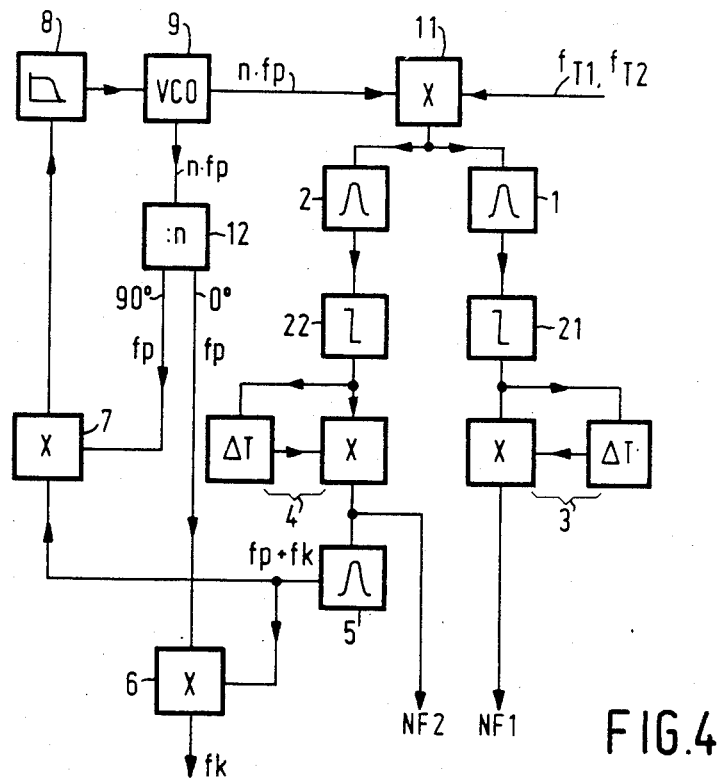
FIG. 4 shows a preferred embodiment of the invention.

As shown in FIG. 4, the two sound carriers are applied to one input of a mixer stage 11, for example a multiplying stage. The other input of this mixer stage receives the output signal of an oscillator 9, whose frequency is 112-times the pilot frequency $f_p$, i.e. approximately 6.125 MHz. Frequency components which correspond to the difference or the sum of the frequencies at the inputs of the mixer stage occur at the output of the mixer stage 11. The lowest of the frequency components are thus located at 625 kHz in accordance with the first sound carrier $f_{T1}$, and 383 kHz in accordance with the second sound carrier $f_{T2}$.

The output of the mixer stage 11 is connected to the inputs of two filters 1 and 2, which separate the sound carriers which have now been converted to 383 kHz and 625 kHz, respectively, from each other. As the frequency spacing is unchanged after the conversion, but the sound carriers are converted to significantly lower frequencies, separating the two sound carriers and their sidebands from each other as regards their frequencies is considerably simpler than in, for example, the circuit described in "Funkschau" 2, 1982, pages 76 to 79, and the selection becomes correspondingly cheaper. In addition, the filters 1 and 2 may, in this frequency range, be in the form of gyrator filters which can be produced in integrated circuit technique to a very large extent.

Figure 3:
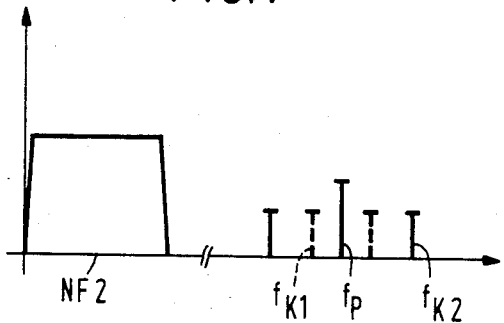
FIG. 3 shows the frequency spectrum of the second sound carrier after frequency demodulation.

The two filters 1 and 2 are followed by limiting amplifiers 21 and 22 which amplify the output signals of the filters 1 and 2 up to the point at which they are limited so that any amplitude-dependence and amplitude noise modulation are suppressed. The output signals of the limiting amplifiers 21 and 22 are applied to FM-demodulators 3 and 4, respectively. The FM-demodulators may be of a conventional construction; however, at the relatively low frequencies to which the sound carriers are converted, the use of delay time demodulators is alternatively possible. Such delay time demodulators comprise a multiplying stage to which the output signal of the limiting amplifier is applied, on the one hand, directly and, on the other hand, with a time delay of one-quarter of a period of the sound carrier whose frequency is reduced by the mixer stage 11, so that for the demodulator 4, a time delay of approximately 0.65 $\mu$sec and for demodulator 3, a time delay of approximately 0.4 $\mu$sec is produced. The low-frequency signal NF1 modulated on the first sound carrier $f_{T1}$ is then obtained at the output of the FM-demodulator 3, while at the output of the FM-demodulator 4, a signal appears which has the frequency spectrum shown in FIG. 3, and contains, in addition to the second NF-signal NF2, the pilot carrier fp having a frequency of 54.687 kHz which is amplitude-modulated by always one of the two identifying signals $f_{K1}$ having a frequency of 117.5 Hz or $f_{K2}$ having a frequency of 274.1 Hz. The demodulated pilot signal is removed with the aid of a bandpass filter 5 and applied to a phase-locked loop circuit 7, 8, 9, 12, and also to an input of a synchronous demodulator 6 constituted by a multiplying stage. In this multiplying stage 6, the output signal of the bandpass filter 5 is mixed with a signal produced by the PLL-circuit, this signal having the same frequency as the pilot signal comprised in the filtered signal and a phase which is the same or shifted through 180°. As a result thereof a signal whose frequency corresponds to the difference between the output signal of the bandpass filter 5 and the PLL-circuit, which accurately corresponds to the frequency of the identifying signal $f_{K1}$ or $f_{k2}$ modulated on the pilot signal, is obtained at the output of the multiplying circuit 6. This signal is used, in known manner, to control the further processing of the low-frequency signals NF1 and NF2.

The phase-locked loop circuit 7, 8, 9, 12 comprises a phase discriminator 7, whose first input receives the output signal of the bandpass filter 5 and whose output is connected to the input of a low-pass filter 8 which suppresses all the modulation products of a higher frequency and is connected to the control input of the oscillator 9 for controlling its frequency. As mentioned in the foregoing, the output signal of the oscillator 9 is applied to the sole input of the mixer stage 11 and also to a frequency divider 12 in which it is divided by $n=112$. The frequency divider 12 has two outputs from which signals having the same frequency but whose phases are shifted through 90° relative to each other can be taken. One of these signals is applied to a second input of the phase discriminator 7 and the other signal to a further input of the synchronous demodulator 6.

The phase-locked loop circuit 7, 8, 9, 12 is synchronized by the output signal of the bandpass filter 5, that is to say by the modulated pilot carrier. In the stationary state of this phase-locked loop circuit, there consequently occur at the output of the frequency divdider 12, oscillations whose frequency accurately corresponds to the frequency of the pilot carrier fp contained in the output signal of the bandpass filter 5, the signal applied to the phase discriminator 7 being shifted through 90° relative to this carrier, while the signal applied to the synchronous demodulator 6 has the same or the opposite phase position.

The 90° phase shift at the two outputs of the frequency divider 12 can, for example, be obtained by using a common frequency divider which divides the output signal of the oscillator 9 to 1:56 being twice the required value and produces two anti-phase output signals which are applied to two 1:2 frequency dividers from whose outputs the two square-wave oscillations, shifted through 90°, can be taken. To obtain the phase shift in the above-described way, it is an absolute condition that n is even.

The invention has been described with reference to an embodiment having a frequency divider ratio $n=112$, but equally good results are obtained with different frequency divider ratios, for example in the range $n=108$ to $n=120$. The circuit according to the invention also then operates satisfactorily when other frequency divider ratios are used, so that the oscillator frequency deviates appreciably from the given value. In this case, the two sound carriers $f_{T1}$ and $f_{T2}$ are however converted to a frequency range which can indeed be below the frequency range in which the sound carriers are located, but which requires a filter cost and design effort higher than in the above-described embodiment.

When a television receiver which comprises the processing section in accordance with the invention for the stereo-dual sound signals must receive television transmissions in accordance with a different standard, in which the sole sound carrier has a different frequency, that is to say in which the frequency spacing between the carriers for the picture information and for the sound information deviate from 5.5 MHz 5.742 MHz, respectively, only the oscillator frequency 9 must be changed such that at the output of the mixer stage 11 a differential frequency is obtained which falls within the pass region of one of the two filters 1 and 2. To this end, the control loop formed by the phase-locked loop circuit is interrupted and instead of the output signal of the low-pass filter 8, the oscillator is supplied with a voltage which controls it to the required frequency.

What is claimed is:

1. A television receiver incorporating a processing section for processing television/stereo-dual sound signals, said sound signals having a first sound carrier ($f_{T1}$) which is modulated by a first sound signal (NF1), and a second sound carrier ($f_{T2}$) which is modulated both by a second sound signal (NF2) and also by a pilot signal (fp) which is, in turn, modulated by a stereo-dual sound identifying signal ($f_{K1}$, $f_{K2}$), said processing section comprising means for demodulating said first and said second sound carriers, respectively, forming said first sound signal, and said second sound signal along with said modulated pilot signal, a phase-locked loop having a frequency-controlled oscillator and a phase discriminator for controlling said frequency-controlled oscillator, said phase discriminator comparing a signal derived from said frequency-controlled oscillator with a reference signal which, in regard to frequency and phase, is in a fixed relationship to the modulated pilot signal, and a synchronous demodulator, coupled to an output of said phase-locked loop, for demodulating said modulated pilot signal thereby recovering said stereo-dual sound identifying signal, characterized in that said processing section further comprises a mixer for receiving at least said modulated second sound carrier, to which is also applied an output signal of said frequency-controlled oscillator, said mixer converting said modulated second sound carrier to a lower frequency range, said demodulating means being coupled to an output of said mixer and comprising at least a demodulator for said modulated second sound carrier forming at an output thereof said second sound signal and said modulated pilot signal, and a filter coupled to the output of said demodulatoar for selecting the modulated pilot signal therefrom, said modulated pilot signal then being applied to said phase discriminator in said phase-locked loop as said reference signal.

2. A circuit arrangement as claimed in claim 1, characterized in that said phase-locked loop further comprises a frequency divider coupled to the output of the oscillator, said frequency divider having two outputs coupled, respectively, to said phase discriminator and to the synchronous demodulator, said two outputs providing signals having the same frequency and having a phase shift through 90° therebetween.

3. A circuit arrangement as claimed in claim 2, characterized in that the frequency divider divides the oscillator output signal by the ratio 1:n, where n is an integer between 108 and 120, preferably an even number.

* * * * *